US008009158B2

(12) United States Patent
Chen et al.

(10) Patent No.: US 8,009,158 B2
(45) Date of Patent: Aug. 30, 2011

(54) DISPLAY DEVICE, MANUFACTURING METHOD THEREOF, CONTROL METHOD THEREOF, AND OPTOELECTRONIC DEVICE

(75) Inventors: Chi-Wen Chen, Hsinchu (TW); Min-Feng Chiang, Hsinchu (TW); Ming-Sheng Lai, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 835 days.

(21) Appl. No.: 12/018,210

(22) Filed: Jan. 23, 2008

(65) Prior Publication Data

US 2009/0073107 A1 Mar. 19, 2009

(30) Foreign Application Priority Data

Sep. 17, 2007 (TW) .............................. 96134697 A

(51) Int. Cl.
*G06F 3/038* (2006.01)

(52) U.S. Cl. ....................................... 345/207; 345/102

(58) Field of Classification Search .................. 345/102, 345/226, 204, 88, 87, 207
See application file for complete search history.

(56) References Cited

U.S. PATENT DOCUMENTS 4,329,625 A * 5/1982 Nishizawa et al. ........... 315/158
6,710,318 B2 3/2004 Lin
6,809,718 B2 * 10/2004 Wei et al. ...................... 345/102
6,947,102 B2 * 9/2005 den Boer et al. ................ 349/12
7,064,733 B2 * 6/2006 Cok et al. ........................ 345/76
7,663,080 B2 * 2/2010 Tsai ............................. 250/205
7,777,736 B2 * 8/2010 Fujita et al. ................... 345/207
2003/0137485 A1 7/2003 Wei et al.
2006/0202947 A1 9/2006 Lee
2007/0296685 A1 * 12/2007 Kang et al. .................... 345/102

FOREIGN PATENT DOCUMENTS

| | | |
|---|---|---|
| CN | 1870281 | 11/2006 |
| CN | 1940649 | 4/2007 |
| JP | 11135291 | 5/1999 |
| TW | 422356 | 2/2001 |
| TW | 465105 | 11/2001 |
| TW | 575849 | 2/2004 |
| TW | 200520549 | 6/2005 |
| TW | 200537691 | 11/2005 |
| TW | 200538802 | 12/2005 |
| TW | M308466 | 3/2007 |
| TW | 200727022 | 7/2007 |

OTHER PUBLICATIONS

"2nd Office Action of China counterpart application", issued on Apr. 17, 2009, p. 1-p. 6.
"Office Action of Taiwan Counterpart Application", issued on Jun. 7, 2011, p1-p8, in which the listed references were cited.

* cited by examiner

*Primary Examiner* — Chanh Nguyen
*Assistant Examiner* — James Nokham
(74) *Attorney, Agent, or Firm* — Jianq Chyun IP Office

(57) ABSTRACT

A display device including a liquid crystal display (LCD) panel, a backlight module, and a photo-sensing device is provided. The backlight module is disposed below the LCD panel and is suitable for providing a light source. The photo-sensing device is built in the LCD panel and includes a plurality of photo-sensors having different illumination sensing capabilities. The backlight module modulates the output intensity of the light source according to the sensed result of one of the photo-sensors. Thereby, the display device can precisely modulate the intensity of the back light according to the intensity of ambient light so as to improve the contrast ratio and to reduce the power consumption.

20 Claims, 3 Drawing Sheets

DISPLAY DEVICE, MANUFACTURING METHOD THEREOF, CONTROL METHOD THEREOF, AND OPTOELECTRONIC DEVICE

CROSS-REFERENCE TO RELATED APPLICATION

This application claims the priority benefit of Taiwan application serial no. 96134697, filed on Sep. 17, 2007. The entirety of the above-mentioned patent application is hereby incorporated by reference herein and made a part of this specification.

BACKGROUND OF THE INVENTION

1. Field of the Invention

The present invention generally relates to a display device and, more particularly, to a display device capable of modulating the brightness of a backlight module thereof according to the intensity of ambient light.

2. Description of Related Art

Along with the development of technologies, flat panel displays, such as liquid crystal display (LCD), plasma display panel (PDP), and so on, have gradually replaced cathode ray tube (CRT) as the mainstream of display products. Presently, thin film transistor liquid crystal display (TFT-LCD) panel is the most commonly-adopted LCD panel.

LCD TV has become commonly accepted along with the increase of its size and the reduction of its price. Meanwhile, the demand to the performance and quality of LCD TV has been increasing, wherein contrast ratio is one of the most important characteristics. Since the contrast ratio of an image displayed by a LCD is affected by the ambient light, brightness of the back light in the LCD should be adjusted according to the intensity of ambient light in order to improve the contrast ratio and to reduce the power consumption of the LCD. In particular, the reduction of power consumption has become one of the most important subjects in today's technology development due to the increasing energy price and global warming.

A display device having photo-sensors for detecting the intensity of ambient light is disclosed in U.S. Pat. No. 6,710, 318. FIG. 1 schematically illustrates the conventional display device having photo-sensors. Referring to FIG. 1, the display device 100 includes a display panel 110 and two photo-sensors 120. The photo-sensors 120 of the display device 100 are close to the display panel 110. The photo-sensors 120 are used for detecting the intensity of ambient light.

Since the photo-current of the photo-sensors 120 is generated in accordance with the intensity of received light, the intensity of the back light in the display device can be adjusted according to the photo-current. However, the photo-sensors 120 are usually more sensitive to light with specific intensities. Namely, the photo-sensors 120 have limited illumination sensing capability. For example, the photo-sensors 120 which has high sensitivity to light with low intensity always outputs a maximum photo-current or a saturated photo-current when the photo-sensors 120 are irradiated by light with medium intensity or light with high intensity, which means the photo-sensors 120 cannot correctly distinguish lights of medium to high intensities. So, the photo-sensors 120 which has high sensitivity to light with high intensity cannot correctly distinguish lights of medium to low intensities because the photo-current produced by the photo-sensors 120 is too small and is easily distorted by noises.

However, in a real circumstance, the intensity of ambient light changes drastically along with the changes of sunlight or different light emitting source provided by a user. Thereby, the contrast ratio of the display device 100 can be enhanced and the power consumption thereof can be reduced if the photo-sensors 120 can detect lights of different intensities precisely.

SUMMARY OF THE INVENTION

Accordingly, the present invention provides a display device capable of detecting the intensity of ambient light and adjusting the intensity of the back light accordingly.

The present invention provides a method for manufacturing a display device having high contrast ratio and low power consumption.

The present invention provides a method for controlling a display device, wherein a backlight module of the display device is controlled to provide a light with appropriate intensity according to the intensity of ambient light.

The present invention provides an electro-optical device capable of appropriately adjusting the display brightness thereof according to the intensity of ambient light.

The present invention provides a display device including a liquid crystal display (LCD) panel, a backlight module, and a photo-sensing device. The backlight module is disposed below the LCD panel and is adapted to provide a light source. The photo-sensing device is built in the LCD panel and includes a plurality of photo-sensors having different illumination sensing capabilities. The backlight module modulates the output intensity of the light source according to the sensed result of one of the photo-sensors.

The present invention provides an electro-optical device including foregoing display device.

The present invention provides a method for manufacturing a display device. The method includes providing a LCD panel, forming a photo-sensing device in the LCD panel, and providing a backlight module. The photo-sensing device includes a plurality of photo-sensors having different illumination sensing capabilities. The backlight module is disposed below the LCD panel and is adapted to provide a light source. The backlight module modulates the output intensity of the light source according to the sensed result of one of the photo-sensors.

The present invention provides a method for controlling the foregoing display device. The method includes detecting an ambient light through a plurality of photo-sensors and modulating the output intensity of a light source according to the sensed result of one of the photo-sensors.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
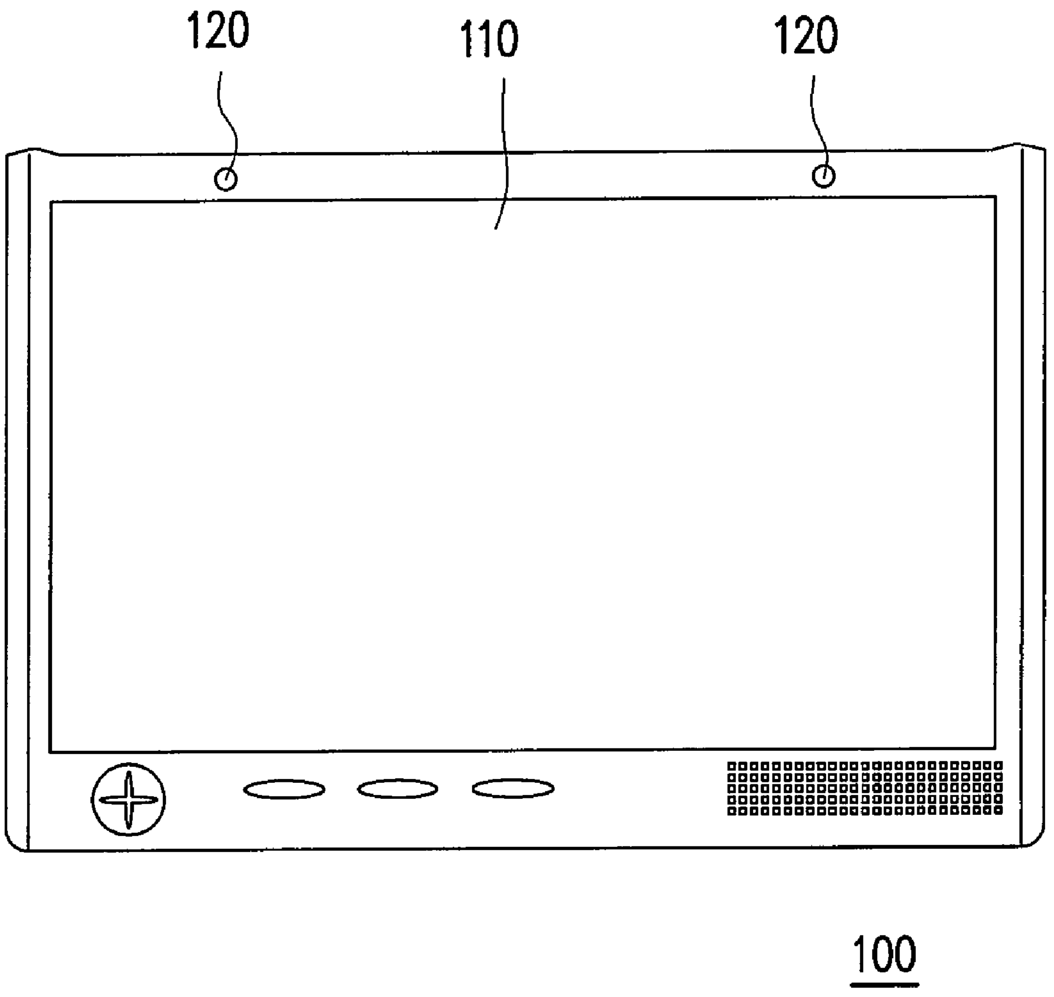
FIG. 1 (PRIOR ART)
FIG. 1 schematically illustrates a conventional display device having photo-sensors.

Reference will now be made in detail to the present preferred embodiments of the invention, examples of which are illustrated in the accompanying drawings. Wherever possible, the same reference numbers are used in the drawings and the description to refer to the same or like parts.

Figure 2:
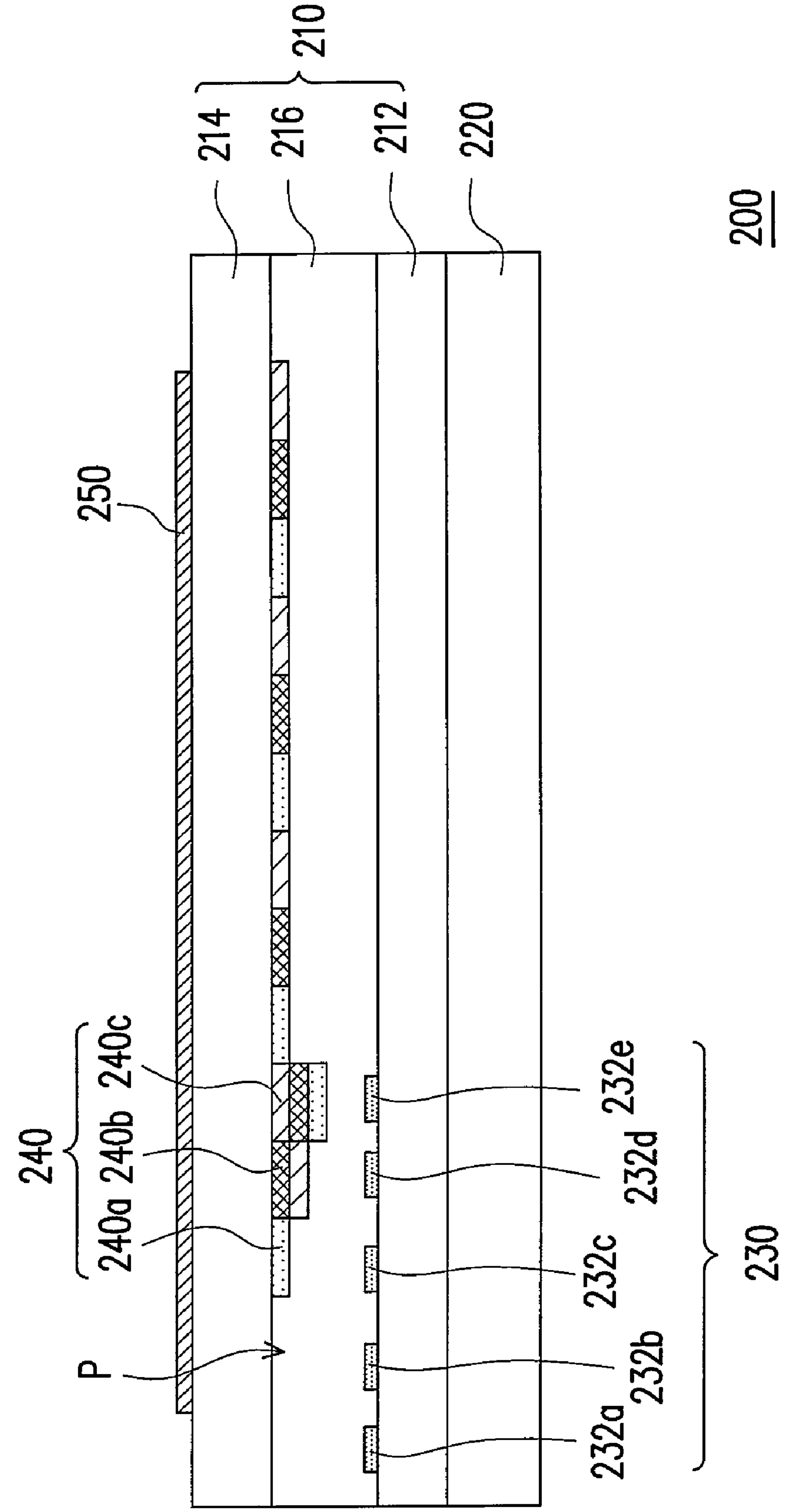
FIG. 2 is a cross-sectional view of a display device according to an embodiment of the present invention.

FIG. 2 is a cross-sectional view of a display device according to an embodiment of the present invention. Referring to FIG. 2, the display device 200 includes a liquid crystal display (LCD) panel 210, a backlight module 220, and a photo-sensing device 230. The backlight module 220 is disposed below the LCD panel 210 and is adapted to provide a light source, such as a plane light source. The light source is provided from a light source unit includes fluorescent lamps (for example, cold cathode fluorescent lamp, hot cathode fluorescent lamp, external electrode fluorescent lamp, flat fluorescent lamp, or other fluorescent lamps, or combinations thereof), point lights (for example, inorganic light emitting diode, organic micromolecule phosphorescent/fluorescent light emitting diode, organic macromolecule phosphorescent/fluorescent light emitting diode, or other diodes, or combinations thereof), plasma plane light sources, carbon nanotube lights, or other types of lights, or combinations thereof. The photo-sensing device 230 is built in the LCD panel 210 and includes a plurality of photo-sensors 232*a*~232*e* having different illumination sensing capabilities. The backlight module 220 modulates the output intensity of the light source according to the sensed result of one of the photo-sensors 232*a*~232*e*.

The method of manufacturing the display device 200 includes providing a LCD panel 210, forming a photo-sensing device 230 in the LCD panel 210, and providing a backlight module 220. The backlight module 220 may be disposed below the LCD panel 210 through a fastening component, such as a frame (not shown), and the backlight module 220 is used for providing a light source, such as a plane light source, but not-limited thereto, the backlight module 220 may be disposed on the side of the LCD panel 210, and then backlight module 220 provides the light source with a light through a light guide plate reaches below the LCD panel 210. The output intensity of the light source can be adjusted according to different illumination situations.

In the present embodiment, each of the photo-sensors 232*a*~232*e* is adapted to detect lights of different illumination range, namely, each of the photo-sensors 232*a*~232*e* has different illumination sensing capability. Some of the photo-sensors 232*a*~232*e* (for example, the photo-sensor 232*a*) have high sensitivity to ambient lights of low illumination, and some of the photo-sensors 232*a*~232*e* (for example, the photo-sensor 232*e*) have high sensitivity to ambient lights of high illumination. It should be mentioned that the illumination ranges detectable to the photo-sensors 232*a*~232*e* could partially overlap with each other.

When the ambient light is weak (for example, the illumination is substantially lower than a specific value), the sensed result of the photo-sensor 232*a* is more reliable and accordingly the backlight module 220 can appropriately reduce the output intensity of the light source (such as the plane light source) according to the sensed result of the photo-sensor 232*a* so as to reduce the power consumption of the display device 200. Contrarily, when the ambient light is strong (namely, the illumination is substantially higher than a specific value), the sensed result of the photo-sensor 232*e* is more reliable and accordingly the backlight module 220 can appropriately increase the output intensity of the light source according to the sensed result of the photo-sensor 232*e* so as to improve the contrast ratio of the display device 200. Accordingly, the backlight module 220 can output a corresponding light source of different intensity according to the intensity of ambient light.

Figure 3:
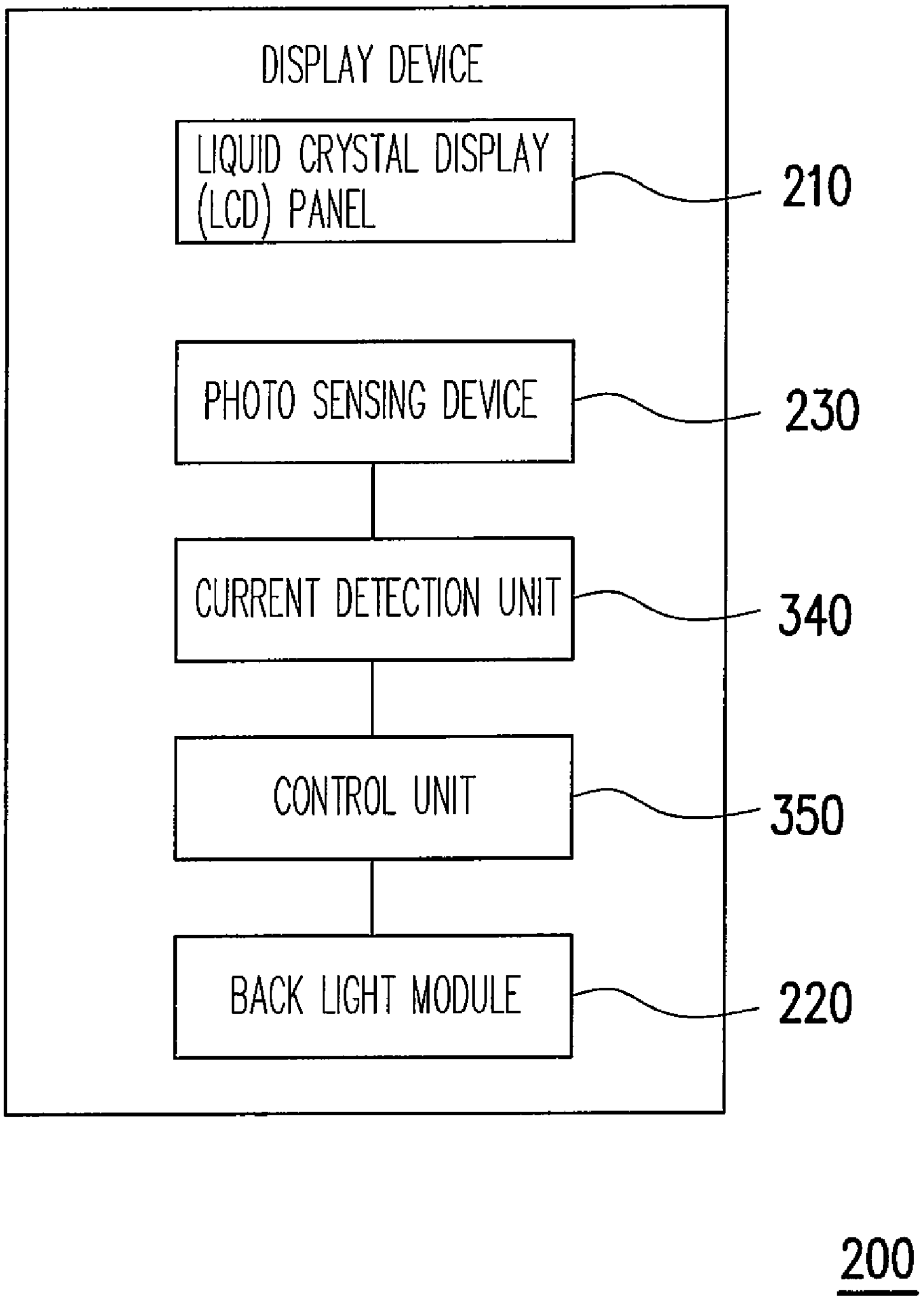
FIG. 3 is a block diagram illustrating various components in a display device according to an embodiment of the present invention.

FIG. 3 is a block diagram illustrating various components in a display device according to an embodiment of the present invention. Referring to FIG. 3, the display device 200 includes a LCD panel 210, a photo-sensing device 230, a current detection unit 340, a control unit 350, and a backlight module 220. The current detection unit 340 is electrically connected to the photo-sensing device 230, and the control unit 350 is electrically connected between the current detection unit 340 and the backlight module 220.

When the current detection unit 340 detects the photo-current produced by the photo-sensors 232*a*~232*e* in the photo-sensing device 230, the current detection unit 340 determines a most reliable photo-current according to an initial setting thereof and sends a corresponding induced current feedback to the control unit 350. The control unit 350 then modulates the output intensity of a light source of the backlight module 220 according to the induced current received from the current detection unit 340. Thereby, the photo-current detected by the photo-sensors 232*a*~232*e* is the key for determining how to modulate the light source of the backlight module 220. The light source of the backlight module 220 cannot be correctly modulated if the photo-current detected by the photo-sensors 232*a*~232*e* are either saturated or too weak. However, in other embodiments of the present invention, the current detection unit 340 may be omitted and the photo-current produced by the photo-sensors 232*a*~232*e* may be directly transmitted to the control unit 350 in order to calculate and determine the signal (voltage/current) to be transmitted to the backlight module 220 for modulating the output intensity of the light source of the backlight module 220.

Generally, the photo-sensors 232*a*~232*e* in the display device 200 may be semiconductor devices. If the photo-sensors 232*a*~232*e* are transistors, such as thin film transistors, the photo-current produced by the photo-sensors 232*a*~232*e* when the photo-sensors 232*a*~232*e* detect lights can be expressed as:

$$I_{ph} = \frac{W}{L} \times \mu C_i \times V_{GS} V_{DS} \times N_{ph} \times \theta_{RGB} \times T_{coef} \quad \text{(Formula 1)}$$

wherein $I_{ph}$ is the photo-current produced by the photo-sensors 232*a*~232*e*; W is the semiconductor channel width of the photo-sensors 232*a*~232*e*; L is the semiconductor channel length of the photo-sensors 232*a*~232*e*; $N_{ph}$ is the number of photons; $\theta_{RGB}$ is opto-electronic conversion efficiency; and $T_{coef}$ is a temperature coefficient.

It can be understood from formula 1 that the value of the photo-current $I_{ph}$ is affected by the photon number $N_{ph}$ and the channel width/length ratio W/L of the photo-sensors 232*a*~232*e*. With a fixed channel width/length ratio W/L, the more photons received by the photo-sensors 232*a*~232*e*, the larger the photo-current $I_{ph}$ is. Theoretically, only one of the photo-sensors 232*a*~232*e* is enough for detecting the change of the ambient light.

However, the photo-current $I_{ph}$ produced by the photo-sensors 232*a*~232*e* with the fixed channel width/length ratio W/L is only within a specific range. In other words, the photo-current $I_{ph}$ produced by the photo-sensors 232*a*~232*e* has a specific saturation value and cannot be increased infinitely. In addition, the number of photons received by the photo-sensors 232*a*~232*e* cannot be correctly reflected due to interference of other noises when the photo-current $I_{ph}$ is too weak. Thus, the photo-sensors 232*a*~232*e* cannot produce a correct photo-current $I_{ph}$ corresponding to the photon number $N_{ph}$ when the photon number $N_{ph}$ is substantially greater or substantially lower than a specific value. Accordingly, in the present invention, one or more layers of filter films can be adopted to reduce the photon number $N_{ph}$ received by the photo-sensor, or the specifications (for example, the channel width/length ratio W/L) of the photo-sensors 232*a*~232*e* are changed so as to provide a photo-sensing device 230 which has good sensing capability to lights within various illumination ranges.

Referring to FIG. 2, the LCD panel 210 further includes a color filter layer 240 and a polarizer 250, wherein the color filter layer 240 and the polarizer 250 are located above at least some of the photo-sensors, such as photo-sensors 232*c*~232*e*. The color filter layer 240 includes a plurality of color filter films 240*a*, 240*b*, and 240*c*, and the color filter layer 240 may have an opening P. The photo-sensor 232*a* is located outside of the color filter layer 240 and the polarizer 250, the photo-sensors 232*b*~232*e* are all located below the polarizer 250, and the photo-sensors 232*c*~232*e* are also located below the color filter layer 240 as an exemplification. Specifically, in the LCD panel 210, since the photo-sensors 232*a* and 232*b* are located below the opening P of the color filter layer 240, there is no color filter film 240*a*, 240*b*, or 240*c* above the photo-sensors 232*a* and 232*b*. There is a color filter film 240*a* above the photo-sensor 232*c*. There are two overlapping color filter films 240*a* and 240*b* above the photo-sensor 232*d*. There are three overlapping color filter films 240*a*, 240*b*, and 240*c* above the photo-sensor 232*e*. However, in other embodiments of the present invention, the photo-sensor 232*a* may also be disposed below the polarizer 250, and there may be one color filter film 240*a*, or two overlapping color filter films 240*a* and 240*b* or three overlapping color filter films 240*a*, 240*b*, and 240*c* above the other photo-sensors, and the photo-sensor 232*b* may be disposed below the polarizer 250 and/or the color filter films according to the actual design requirement. It has to be noted that, in the present embodiment of the present invention, the color filter films of three different colors are adopted only as an example, and color filter films of one, two, four, five, or six different colors may also be used therein.

The polarizer 250 and the color filter films 240*a*, 240*b*, and 240*c* have different transmittances to white light. For example, assuming the color filter films 240*a*, 240*b*, and 240*c* are respectively red, green, and blue color filter film, then the transmittances of the color filter films 240*a*, 240*b*, and 240*c* and different combinations thereof to white light and the transmittance of the polarizer 250 to white light are as listed in table 1.

TABLE 1 transmittances of the polarizer 250, the color filter films 240a, 240b, and 240c, and different combinations of the color filter films 240a, 240b, and 240c to D65 white light.

| | Film | | | | | | | | |
|---|---|---|---|---|---|---|---|---|---|
| | None | Polarizer | Red | Green | Blue | R + G | G + B | R + B | R + G + B |
| Transmittance (%) | 100 | 45~55 | 44.2 | 41.4 | 33.7 | 13.3 | 12.6 | 3.3 | 0.5 |

Only lights in a specific polarization direction can go through the polarizer 250 to enter the LCD panel 210, thus, the disposition of the polarizer 250 also affects the transmittance. In other words, with the same ambient light intensity, the photo-sensor 232*a* receives the most photons, the photo-sensor 232*b* comes next, and the photo-sensors 232*c*~232*e* receive least photons. When the photo-sensors 232*a*~232*e* are made of thin film transistors or other semiconductor devices of the same specifications, the photosensitivity of the photo-sensor 232*a* is reduced and accordingly the increment in the photo-current produced by the photo-sensor 232*a* is also reduced when the ambient light illumination is substantially greater than a specific value (for example, 5000~10000 lux, substantially greater than or substantially equal to 10000 lux, or other values). Namely, the photo-sensor 232*a* reaches a curve section (unreliable section) of a graph of illumination and photosensitivity. However, with the same ambient light illumination, the increment in the photo-current $I_{ph}$ produced by at least one of the photo-sensors 232*b*~232*e* may not be reduced, namely, the photo-sensor is still within a straight line section (reliable section) of the graph of illumination and photosensitivity. As described above, in the present embodiment, at least one of the photo-sensors 232*a*~232*e* can precisely detect the change of the intensity of ambient light and produce a photo-current correspondingly according to the intensity of the ambient light.

Specifically, the transmittances of the color filter layer 240 corresponding to the photo-sensors 232*c*~232*e* are respectively T1, T2, and T3. As shown in table 1, T1>T2>T3. If the photo-sensors 232*c*~232*e* have the same specifications, the ambient light illuminations detected by the photo-sensors 232*c*, 232*d*, and 232*e* are respectively L1, L2, and L3, wherein L1<L2<L3. In other words, when the color filter layer 240 corresponding to the photo-sensor 232*e* has lower transmittance or the color filter layer 240 includes a plurality of layers of the color filter films 240*a*, 240*b*, or 240*c*, the photo-sensor 232*e* is adapted to detect ambient light of higher intensity.

Furthermore, the number of photons received by each of the photo-sensors 232*a*~232*e* is quite different. According to table 1, when the ambient light is very strong, the photon number $N_{ph}$ received by the photo-sensor 232*a* is about 200 times of the photon number $N_{ph}$ received by the photo-sensor 232*e* because about 99.5% of light can be filter out by the color filter films 240*a*, 240*b* and 240*c* located above the photo-sensor 232*e*. At this time, the photo-current $I_{ph}$ produced by the photo-sensor 232*e* does not reach its saturation therefore a more accurate sensed result can be provided. Contrarily, the photo-current $I_{ph}$ produced by the photo-sensors 232*a*, 232*b*, 232*c*, or even 232*d* may have all reached saturated state, and therefore, the photo-sensors 232*a*, 232*b*, 232*c* or even 232*d* cannot provide accurate sensed results. On the other hand, only the photo-sensor 232*a* can provide an accurate photo-current $I_{ph}$ when the ambient light is very weak.

In the present invention, the colors of the color filter films 240*a*, 240*b*, and 240*c* disposed corresponding to the photo-sensors 232*a*~232*e* are not limited in the present invention. In other embodiments of the present invention, color filter films 240*a*, 240*b*, and 240*c* of different colors can be disposed interchangeably above the corresponding photo-sensors 232*a*~232*e*. In addition, the number of the photo-sensors 232*a*~232*e* is not limited to five. Instead, two, three, four, six, or even more photo-sensors 232*a*~232*e* can be disposed in the LCD panel 210 according to the actual design requirement. Substantially, the photo-sensors 232*a*~232*e* can be all disposed within a display area or a non-display area of the LCD panel 210, or some of the photo-sensors 232*a*~232*e* are disposed within the display area of the LCD panel 210 and the other photo-sensors 232*a*~232*e* are disposed within the non-display area of the LCD panel 210. If some of the photo-sensors 232*a*~232*e* are disposed within the display area of the LCD panel 210 may the polarizer 250 and one of the color filter film 240*a*~240*c* has at least one opening P substantially corresponding to some one of the photo-sensors 232*a*~232*e*.

In order to allow the photo-sensors 232*a*~232*e* to detect the ambient light within different illumination range, other design can be adopted also. For example, if the photo-sensors 232*a*~232*e* are transistors, the channel width/length ratios W/L of the transistors will affect the photo-current produced by the photo-sensors 232*a*~232*e* as shown in formula 1. The higher the channel width/length ratio W/L of a photo-sensor is, the less number of photons is required by the photo-sensor for producing sufficient photo-current $I_{ph}$, and accordingly ambient light within the lower illumination range the photo-sensor can detect. Contrarily, to allow a photo-sensor to detect the ambient light within a high illumination range, the channel width/length ratios of the photo-sensors 232*a*~232*e* should be reduced in order to prevent the photo-current $I_{ph}$ produced by the photo-sensors 232*a*~232*e* from reaching or exceeding their saturations and accordingly losing their precision.

It should be mentioned that, the photo-sensors 232*a*~232*e* of different specifications may also be combined with films of different light transmittances, such as the color filter layer 240 and/or the polarizer 250, to allow the photo-sensing device 230 to detect the ambient light within different illumination range. Thus, the backlight module 220 can always modulate the intensity of the light source precisely no matter how the ambient light changes. In other words, the backlight module 220 can provide a back light of appropriate brightness so that the display device 200 can have a good contrast ratio under strong light and the power consumption of the backlight module 220 can be reduced under weak light.

Furthermore, the LCD panel 210 includes an active device array substrate 212, an opposite substrate 214, and a liquid crystal layer 216. The opposite substrate 214 is disposed above the active device array substrate 212. The display media layer (such as a liquid crystal layer, an electroluminescent layer, or combinations thereof) 216 is disposed between the active device array substrate 212 and the opposite substrate 214. In the embodiment, the display media layer is the liquid crystal layer as an exemplification, but not limited it. In another embodiment, if the display media layer is the electroluminescent layer, the display device has not any the light source installed in the backlight module (or namely module) below the display panel. The photo-sensors 232*a*~232*e* are disposed on the active device array substrate 212 and the color filter layer 240 is disposed on the opposite substrate 214. In an alternative embodiment of the present embodiment, the photo-sensors 232*a*~232*e* may also be disposed inside or below the active device array substrate 212. In other embodiments of the present invention, the color filter layer 240 may also be disposed on the active device array substrate 212 so that the LCD panel 210 can have a color filter on array (COA) or array on color filter (AOC) structure. When the photo-sensors 232*a*~232*e* in the present embodiment are thin film transistors, the photo-sensors 232*a*~232*e* can be fabricated on the active device array substrate 212 while forming the active device array. Thereby, the fabrication of the photo-sensors 232*a*~232*e* is compatible with the existing fabrication process of the active device array substrate 212.

Moreover, the display device 200 as described above can be electrically connected to other electronic devices for forming an electro-optical device. The electronic devices include control devices, operation devices, processing devices, input devices, memory devices, driving devices, light emitting devices, protection devices, sensor devices, detection devices, or devices of other functions, or a combination of foregoing devices. The electro-optical device may be a portable product (for example, a cell phone, a video camera, a camera, a notebook computer, a game box, a watch, a music player, an email sender/receiver, a map navigator, a digital photo, or similar products), a video/audio product (for example, a video/audio player or similar products), a screen, a TV, a indoor/outdoor bulletin board, a panel within a projector etc. In addition, the LCD panel 210 described above can be categorized according to at least one of the type of pixel electrodes thereof and the type of liquid crystal molecules thereof into transmissive, transflective, reflective, vertically aligned (VA), in-plane switching (IPS), multi-domain vertically aligned (MVA), twisted nematic (TN), super twisted nematic (STN), patterned vertically aligned (PVA), super patterned vertically aligned (S-PVA), advanced super view (ASV), fringe field switching (FFS), continuous pinwheel aligned (CPA), axially symmetric aligned microcell (ASM), optically compensated bend (OCB), super in-plane switching (S-IPS), advanced super in-plane switching (AS-IPS), ultra fringe field switching (UFFS), polymer stabilized aligned, dual-view, triple-view, or other types of panels, or a combination of foregoing panels.

It has to be stated that the material of the thin film transistors or other semiconductor devices in the embodiments described above includes polysilicon, amorphous silicon, single crystal, microcrystalline silicon, germanium silicide, or other materials, or a combination of foregoing materials.

In summary, a display device provided by the present invention has at least some of the following advantages. In the display device of the present invention, since a photo-sensor includes a plurality of photo-sensors having different sensing capabilities, the photo-sensor can detect ambient lights within various illumination ranges. In other words, the photo-sensor can precisely detect the ambient light according to the intensity of the ambient light, and a backlight module can modulate the output intensity of a light source (such as a plane light source) appropriately according to a sensed result of the photo-sensor. Thereby, the display device provided by the present invention has enhanced contrast ratio under different ambient light intensities. Moreover, the power consumption of the display device is reduced by appropriately modulating the light provided by the backlight module. Furthermore, in the present invention, the photo-sensor can be disposed in a LCD panel through existing LCD panel process, and therefore, no additional cost or process is required for fabricating the photo-sensor within the LCD panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:

a liquid crystal display (LCD) panel comprising an optical film;

a backlight module disposed below the LCD panel, the backlight module providing a light source; and a photo-sensor built in the LCD panel, the photo-sensor comprising a plurality of photo-sensors having different detection ranges, the backlight module modulating an output intensity of the light source according to a sensed result of one of the photo-sensors, parts of the photo-sensors being covered by the optical film and other parts of the photo-sensors being uncovered by the optical film, wherein intensity of the ambient light received by the parts of the photo-sensors covered by the optical film is reduced by the optical film and is substantially less than intensity of the ambient light received by the other parts of the photo-sensors uncovered by the optical film.

2. The display device according to claim 1, further comprising at least one current detection unit, electrically connected to the photo-sensors, and adapted to detect an induced current generated by each of the photo-sensors.

3. The display device according to claim 2, further comprising at least one control unit, electrically connected to the current detection unit and the backlight module, and adapted to modulate the output intensity of the light source according to a detected result of the current detection unit.

4. The display device according to claim 1, further comprising at least one control unit, electrically connected to the backlight module, and adapted to modulate the output intensity of the light source.

5. The display device according to claim 1, wherein the optical film comprises at least one polarizer selectively covering parts of the photo-sensors, and intensity of the ambient light received by the parts of the photo-sensors covered by the polarizer is reduced by the polarizer and is less than intensity of the ambient light received by the other parts of the photo-sensors uncovered by the polarizer.

6. The display device according to claim 1, wherein the optical film comprises at least one polarizer selectively covering parts of the photo-sensors and a color filter layer selectively covering the parts of the photo-sensors covered by the polarizer, and intensity of the ambient light received by the parts of the photo-sensors covered by the color filter layer is reduced by the color filter layer and is less than intensity of the ambient light received by the other parts of the photo-sensors uncovered by the color filter layer.

7. The display device according to claim 6, wherein the color filter layer comprises a plurality of color filter films having different transmittances, and intensities of the ambient light received by the photo-sensors covered by different color filter films are substantially different.

8. The display device according to claim 6, wherein the color filter layer comprises a plurality of color filter films having different transmittances, the color filter films are overlapped or non-overlapped to form a plurality of stacked configurations, and intensities of the ambient light received by the photo-sensors covered by different stacked configurations are substantially different.

9. The display device according to claim 6, wherein the LCD panel comprises:

an active device array substrate;

an opposite substrate disposed above the active device array substrate; and a liquid crystal layer disposed between the active device array substrate and the opposite substrate, wherein the photo-sensors are disposed on the active device array substrate and the color filter layer is disposed on the opposite substrate.

10. The display device according to claim 6, wherein the LCD panel comprises:

an active device array substrate;

an opposite substrate disposed above the active device array substrate; and a liquid crystal layer disposed between the active device array substrate and the opposite substrate, wherein the photo-sensors and the color filter layer are disposed on the active device array substrate.

11. The display device according to claim 6, wherein the photo-sensors comprise at least one first photo-sensor adapted to sense an ambient light with illumination L1 and at least one second photo-sensor adapted to sense another ambient light with illumination L2, the illumination Ll is substantially greater than the illumination L2, the transmittance of the color filter layer corresponding to the first photo-sensor is T1, the transmittance of the color filter layer corresponding to the second photo-sensor is T2, and T1 is substantially smaller than T2.

12. The display device according to claim 1, wherein the photo-sensors comprise a plurality of semiconductor devices.

13. The display device according to claim 12, wherein the photo-sensors comprise a plurality of transistors, and each of the transistors has a channel length/width ratio, the transistors having different detection ranges have substantially different channel length/width ratios.

14. The display device according to claim 13, wherein the channel length/width ratios of the photo-sensors adapted to detect low illumination range are substantially smaller than the channel length/width ratios of the photo-sensors adapted to sense detect high illumination range.

15. An electro-optical device, comprising the display device of claim 1.

16. A method for controlling the display device of claim 1, comprising:

sensing an intensity of an ambient light through the photo-sensors in the photo-sensing device, parts of the photo-sensors being covered by the optical film and other parts of the photo-sensors being uncovered by the optical film, wherein intensity of the ambient light received by the parts of the photo-sensors covered by the optical film is reduced by the optical film and is less than intensity of the ambient light received by the other parts of the photo-sensors uncovered by the optical film; and modulating an output intensity of the light source according to a sensed result of one of the photo-sensors.

17. The display device according to claim 1, wherein the optical film comprises a color filter layer selectively covering parts of the photo-sensors, and intensity of the ambient light received by the parts of the photo-sensors covered by the color filter layer is reduced by the color filter layer and is less than intensity of the ambient light received by the other parts of the photo-sensors uncovered by the color filter layer.

18. The display device according to claim 17, wherein the color filter layer comprises a plurality of color filter films having different transmittances, and intensities of the ambient light received by the photo-sensors covered by different color filter films are substantially different.

19. The display device according to claim 17, wherein the color filter layer comprises a plurality of color filter films having different transmittances, the color filter films are overlapped or non-overlapped to form a plurality of stacked configurations, and intensities of the ambient light received by the photo-sensors covered by different stacked configurations are substantially different.

20. A method for manufacturing a display device, comprising:

forming a photo-sensing device in a LCD panel having an optical film, wherein the photo-sensor comprises a plurality of photo-sensors having different detection ranges, parts of the photo-sensors being covered by the optical film and other parts of the photo-sensors being uncovered by the optical film, wherein intensity of the ambient light received by the parts of the photo-sensors covered by the optical film is reduced by the optical film and is substantially less than intensity of the ambient light received by the other parts of the photo-sensors uncovered by the optical film; and providing a backlight module, the backlight module being disposed below the LCD panel and adapted to provide a light source, wherein the backlight module modulates an output intensity of the light source according to a sensed result of one of the photo-sensors.

* * * * *